United States Patent
Kashimoto

(10) Patent No.: US 8,310,720 B2
(45) Date of Patent: Nov. 13, 2012

(54) COLOR ADJUSTMENT APPARATUS, IMAGE FORMING APPARATUS, AND COMPUTER-READABLE RECORDING MEDIUM

(75) Inventor: Yosuke Kashimoto, Osaka (JP)

(73) Assignee: KYOCERA Document Solutions Inc. (JP)

( * ) Notice: Subject to any disclaimer, the term of this patent is extended or adjusted under 35 U.S.C. 154(b) by 463 days.

(21) Appl. No.: 12/552,087

(22) Filed: Sep. 1, 2009

(65) Prior Publication Data

US 2010/0123915 A1 May 20, 2010

(30) Foreign Application Priority Data

Nov. 20, 2008 (JP) ................................. 2008-296459

(51) Int. Cl.
- *G06F 15/00* (2006.01)
- *G06K 15/00* (2006.01)
- *G06K 9/00* (2006.01)
- *G03F 3/08* (2006.01)
- *G09G 5/00* (2006.01)
- *G09G 5/02* (2006.01)

(52) U.S. Cl. ......... 358/1.9; 358/2.1; 358/518; 358/1.15; 382/167; 382/165; 382/162; 345/649; 345/591; 345/589; 345/590; 345/600

(58) Field of Classification Search .................. 345/589, 345/649, 591, 590, 600; 382/165, 260, 167, 382/162; 358/2.1, 1.15, 1.9, 518
See application file for complete search history.

(56) References Cited

U.S. PATENT DOCUMENTS

| | | | | |
|---|---|---|---|---|
| 6,163,321 A | * | 12/2000 | Kiyokawa | 345/589 |
| 6,480,624 B1 | * | 11/2002 | Horie et al. | 382/165 |
| 6,504,551 B1 | * | 1/2003 | Takashima et al. | 345/649 |
| 6,888,961 B1 | * | 5/2005 | Tamagawa et al. | 382/162 |
| 7,280,703 B2 | * | 10/2007 | Gallagher et al. | 382/260 |
| 7,948,655 B2 | * | 5/2011 | Goto et al. | 358/2.1 |
| 2004/0017586 A1 | * | 1/2004 | Nichogi | 358/2.1 |
| 2005/0146737 A1 | * | 7/2005 | Ono | 358/1.9 |
| 2007/0296986 A1 | * | 12/2007 | Watanabe et al. | 358/1.9 |
| 2010/0123915 A1 | * | 5/2010 | Kashimoto | 358/1.9 |
| 2010/0195149 A1 | * | 8/2010 | Kashimoto | 358/1.15 |

FOREIGN PATENT DOCUMENTS

| | | |
|---|---|---|
| CN | 1454011 | 11/2003 |
| JP | 2007-096612 | 4/2007 |

OTHER PUBLICATIONS

"Photoshop 7.0 Adjusting Methods, Ideas and Skills of Color Correction Options," Print Today, circa May 2005, reprinted from China Academic Journal Electronic Publishing House.

* cited by examiner

*Primary Examiner* — Akwasi M Sarpong
(74) *Attorney, Agent, or Firm* — McDonnell Boehnen Hulbert & Berghoff LLP

(57) ABSTRACT

A color adjustment apparatus comprises an input unit for receiving an input operation, a color adjustment display segment for displaying orthogonal coordinate systems between a pre color adjustment hue axis and an adjustment target axis indicative of a degree of adjustment of a hue, saturation, or lightness and an adjustment line indicative of a relationship between before color adjustment and after color adjustment on the orthogonal coordinate systems, an adjustment line changing unit for changing the adjustment line in response to an operation by the input unit, and a color adjustment unit for adjusting a hue, saturation, and lightness of a target image in correspondence with the adjustment line changed by the adjustment line changing unit.

17 Claims, 12 Drawing Sheets

COLOR ADJUSTMENT APPARATUS, IMAGE FORMING APPARATUS, AND COMPUTER-READABLE RECORDING MEDIUM

INCORPORATION BY REFERENCE

This application is based upon and claims the benefit of priority from corresponding Japanese Patent Application No. 2008-296459, filed Nov. 20, 2008, the entire contents of which are incorporated herein by reference.

BACKGROUND

1. Field of the Invention

The present invention relates to a color adjustment apparatus for adjusting a hue, saturation, and lightness (including luminance) of a selected hue range via a GUI (Graphical User Interface), an image forming apparatus, and a computer-readable recording medium having a color adjustment program.

2. Description of the Related Art

When a color image acquired by a camera is printed by an image forming apparatus, sometimes printing may be performed without color characteristics being properly corrected. Even if this color correction has been performed, there may be a desire to perform color adjustment on the image.

One method of adjusting color in such a case involves adjusting a hue, saturation, and lightness by converting image data from an RGB color system to image data of an HSV (Hue, Saturation, and Value) or HLS (Hue, Lightness, and Saturation) color system. This color adjustment method is performed by moving a knob of an adjustment slider for a respective one of a hue, saturation, and lightness after a hue range targeted for adjustment has been selected. In addition, an adjustment quantity (gain) relative to the quantity of a knob movement can also be adjusted.

Prior approaches do not effectively keep track of how the adjustment quantity of a respective one of a hue, saturation, and lightness changes in a selected hue range, in response to knob movement. In addition, even if such prior approaches allow gain to be adjusted, it is typically not possible to change the adjustment quantity in the selected hue range. Thus, in order to perform desired color adjustment under these approaches, color adjustment must be performed in a respective range where the hue range to be selected is finely divided.

SUMMARY

The present invention provides a color adjustment apparatus, method, and program, allowing color adjustment to be efficiently performed by providing a visual indication of how color adjustment is performed in a selected hue range.

In an embodiment of the present invention, a color adjustment apparatus comprises an input unit for receiving an input operation, a color adjustment display segment for displaying orthogonal coordinate systems between a pre color adjustment hue axis and an adjustment target axis indicative of a degree of adjustment of a hue, saturation, or lightness, and an adjustment line indicative of a relationship on the orthogonal coordinate systems. An adjustment line changing unit changes the adjustment line in response to an operation by the input unit, and a color adjustment unit adjusts a hue, saturation, and lightness of a target image in response to the changed adjustment line.

Additional features and advantages are described herein, and will be apparent from the following Detailed Description and the figures.

DETAILED DESCRIPTION

Figure 9:
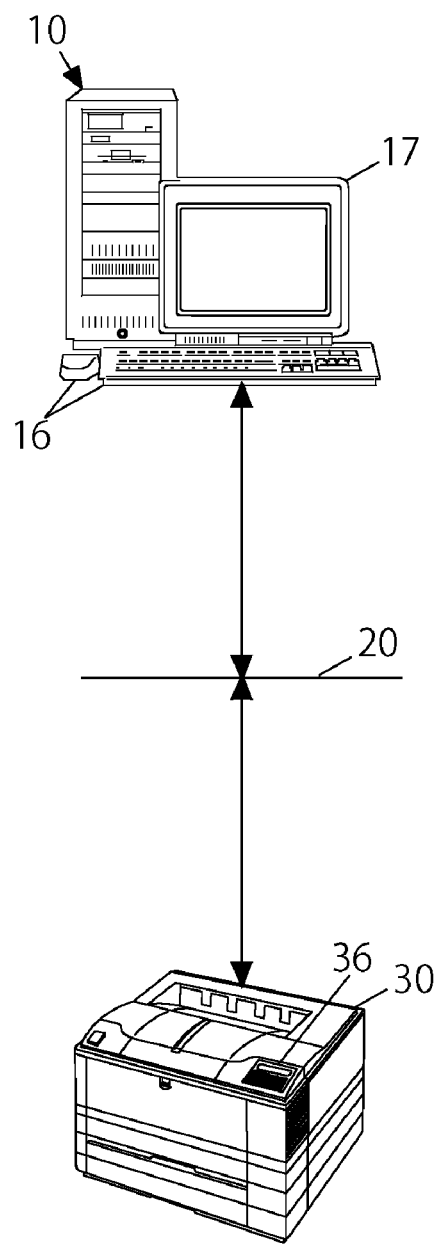
FIG. 9 is a schematic configuration view of an image forming system according to an embodiment of the present invention.

FIG. 9 illustrates a schematic configuration of an image forming system according to an embodiment of the present invention.

In this system, a host computer 10 (an example of a "color adjustment apparatus") is connected to an image forming apparatus 30 via a Local Area Network (LAN) 20. For example, the image data of an RGB color system, acquired by a camera, is color-adjusted by the host computer 10 and the color-adjusted image data is then transmitted to the image forming apparatus 30 to be printed.

Figure 10:
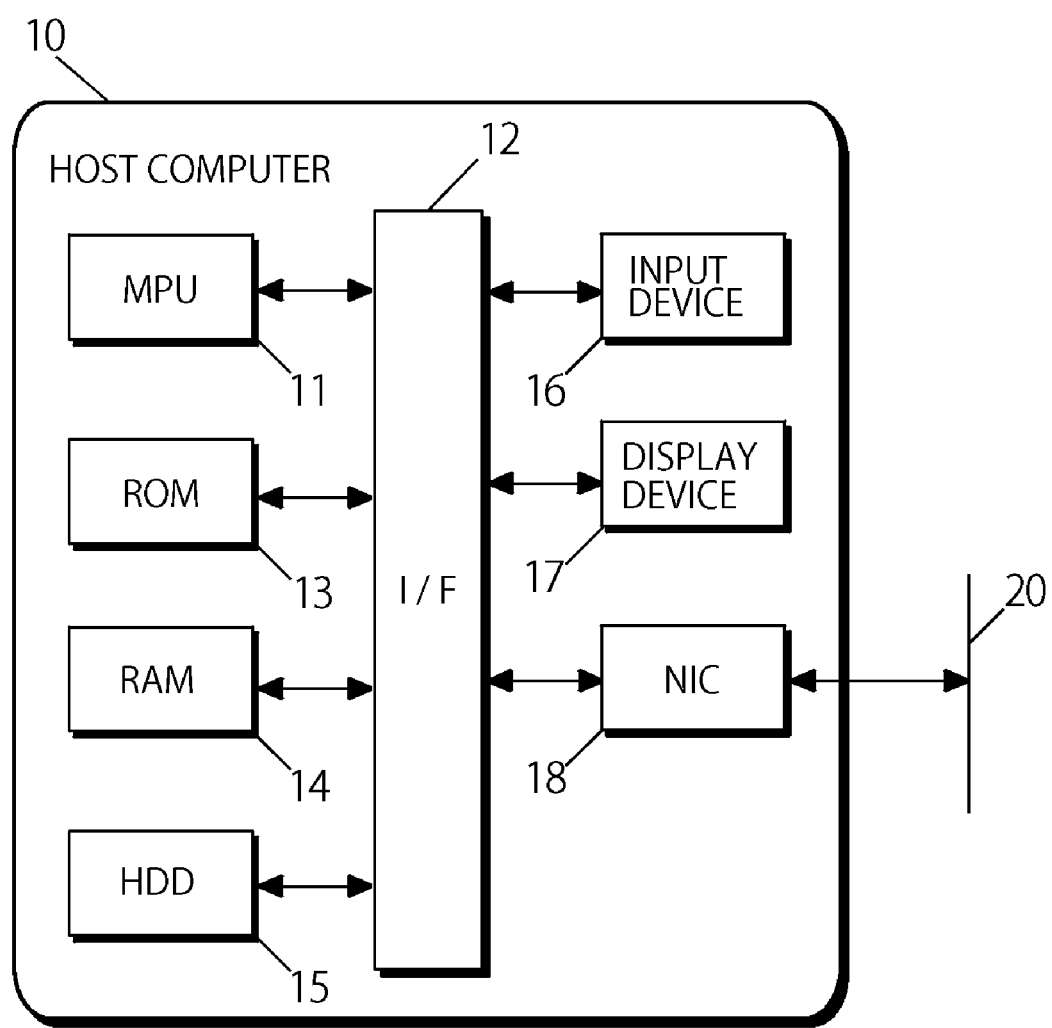
FIG. 10 is a schematic block diagram depicting a hardware configuration of a host computer in FIG. 9.

FIG. 10 illustrates a schematic block diagram depicting a hardware configuration of the host computer 10.

In the host computer 10, a Micro Processing Unit (MPU) 11 is connected via an interface 12 to a Read Only Memory (ROM) 13, a Random Access Memory (RAM) 14, a Hard Disk Drive (HDD) 15 (an example of a "recording medium"), an input device 16, a display device 17, and a network interface 18. In FIG. 10, several types of interfaces are represented in one block 12 for the purpose of simplification.

The HDD 15 (an example of a storage unit) stores an Operating System (OS) with a virtual memory system and a variety of drivers and applications, including a color adjustment program. The ROM 13 stores a bootstrap for loading the OS in the HDD 15 into the RAM 14. The input device 16 has a keyboard and a pointing device, for example. The host computer 10 is connected to a LAN 20 via the network interface 18.

Figure 11:
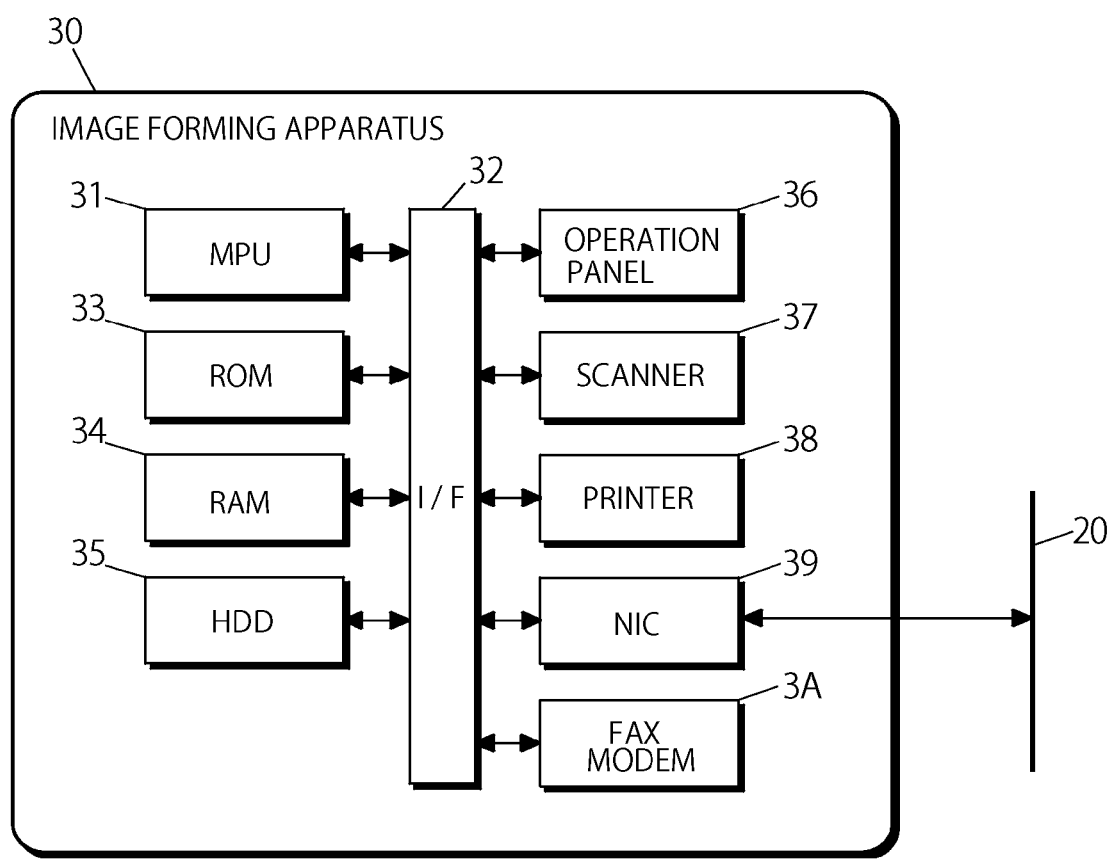
FIG. 11 is a schematic block diagram depicting a hardware configuration of an image forming apparatus in FIG. 9.

FIG. 11 is a schematic block diagram depicting a hardware configuration of the image forming apparatus 30.

In the image forming apparatus 30, an MPU 31 is connected via an interface 32 to a ROM 33, a RAM 34, an HDD 35, an operation panel 36, a scanner 37, a printer 38, a network interface 39, and a FAX 3A.

The ROM 33 stores the OS and a variety of drivers and applications for controlling the operation panel 36, the scanner 37, the printer 38, and the FAX 3A. The RAM 34 is a work area and the HDD 35 is for storing image data. The operation panel 36 is for operating the scanner 37, the printer 38, and the FAX 3A, and has a plurality of operation keys and a display unit (i.e. a screen) for displaying a plurality of display segments. The scanner 37 creates an image file and inputs an image to the printer 38 and the FAX 3A. This image forming apparatus 30 is connected to the LAN 20 via the network interface 39.

Next, a GUI for color adjustment, included in the above-mentioned color adjustment program, will be described.

Figure 3:
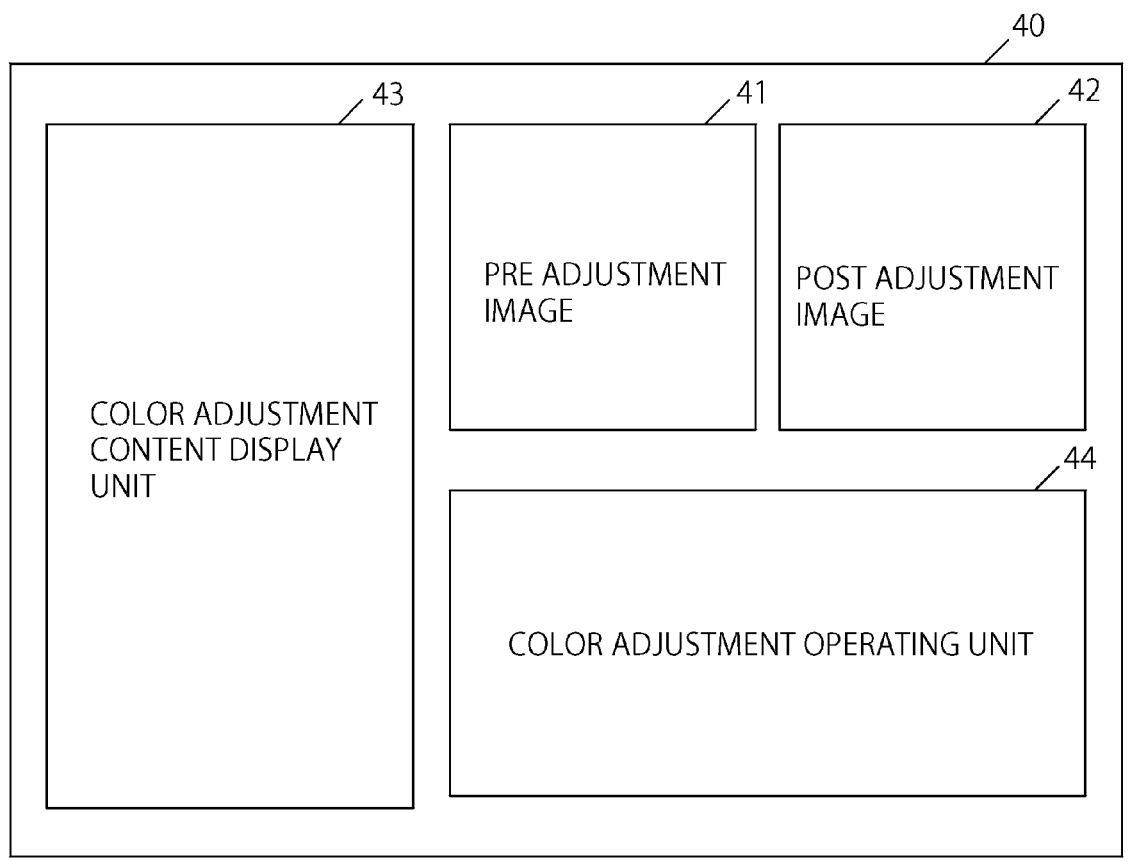
FIG. 3 is a view showing display segments of a GUI screen, displayed on a display device of a host computer, according to an embodiment of the present invention.

FIG. 3 illustrates a plurality of display segments of a screen 40, as displayed on the display device 17 of the host computer 10. A user looks at an image displayed on a pre color adjustment image 41 and considers what hue range and how color adjustment should be performed. The user operates a color adjustment operating unit 44 using the input device 16 to view a visual indication of the content of the adjustment at the color adjustment operating unit 44. This enables the user to visually recognize a post color adjustment image 42.

Figure 4:
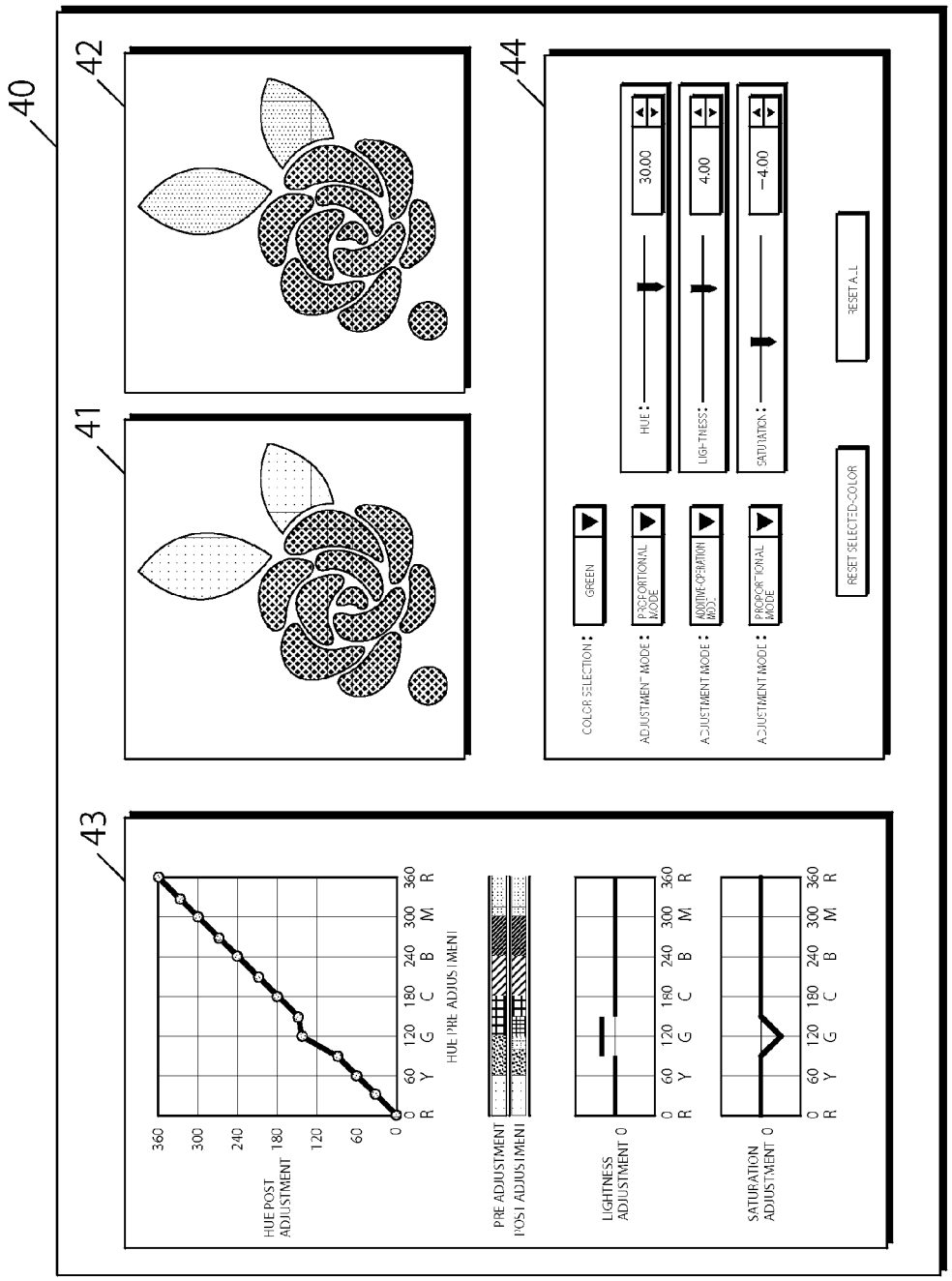
FIG. 4 is a view showing a specific display example displayed at each of the display segments of FIG. 3.

FIG. 4 illustrates a specific display example displayed at each of the display segments of FIG. 3. A pre color adjustment image 41A, a post color adjustment image 42A, a color adjustment display segment 43A, and a color adjustment operating unit 44A, on the screen 40, are specific examples of the pre color adjustment image 41, post color adjustment image 42, color adjustment display segment 43, and a color adjustment operating unit 44, respectively, of FIG. 3.

Figure 5:
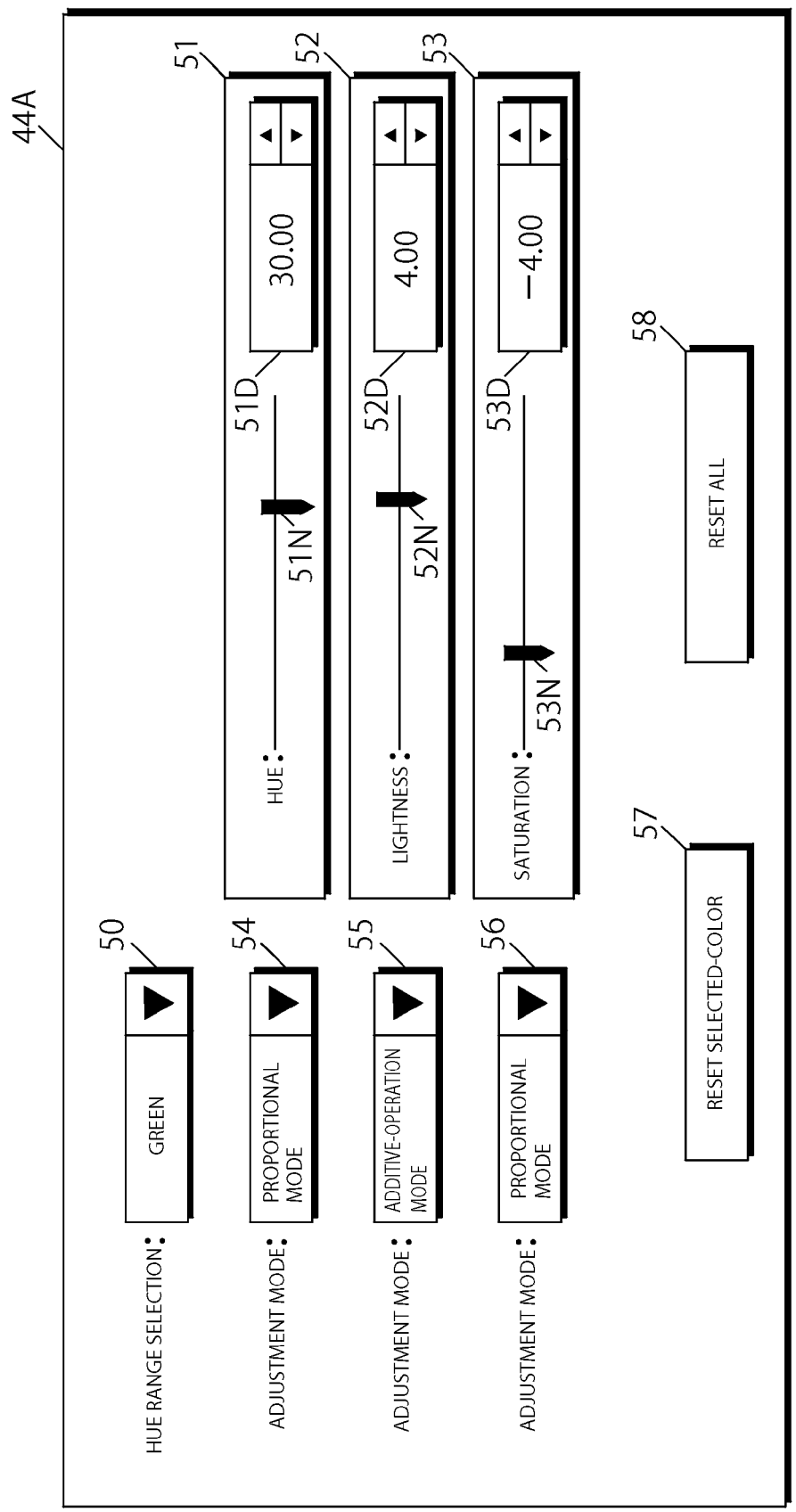
FIG. 5 is an enlarged view of a color adjustment operating unit in FIG. 4.
Figure 6:
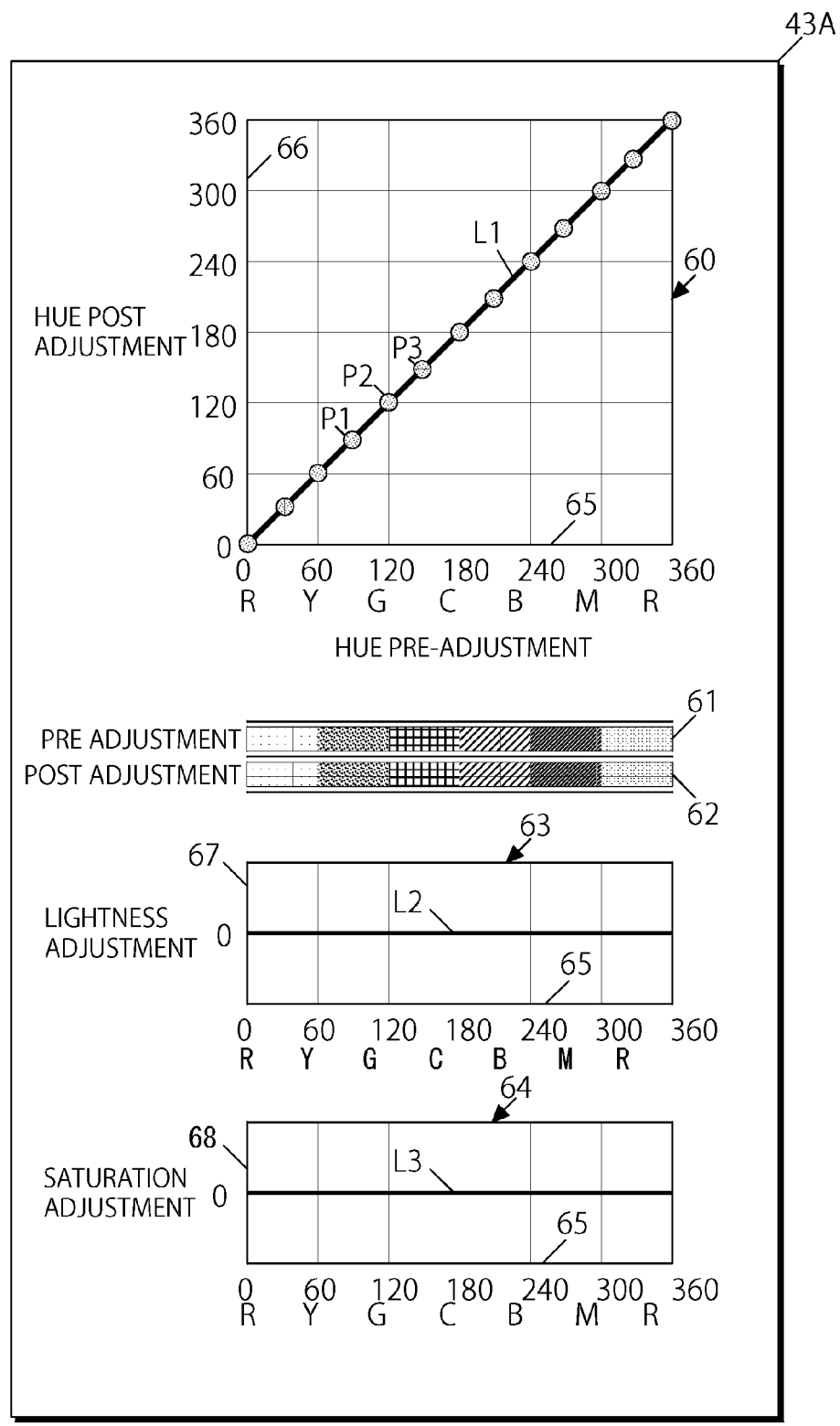
FIG. 6 is an enlarged view of a color adjustment display segment in FIG. 4 before color adjustment.
Figure 7:
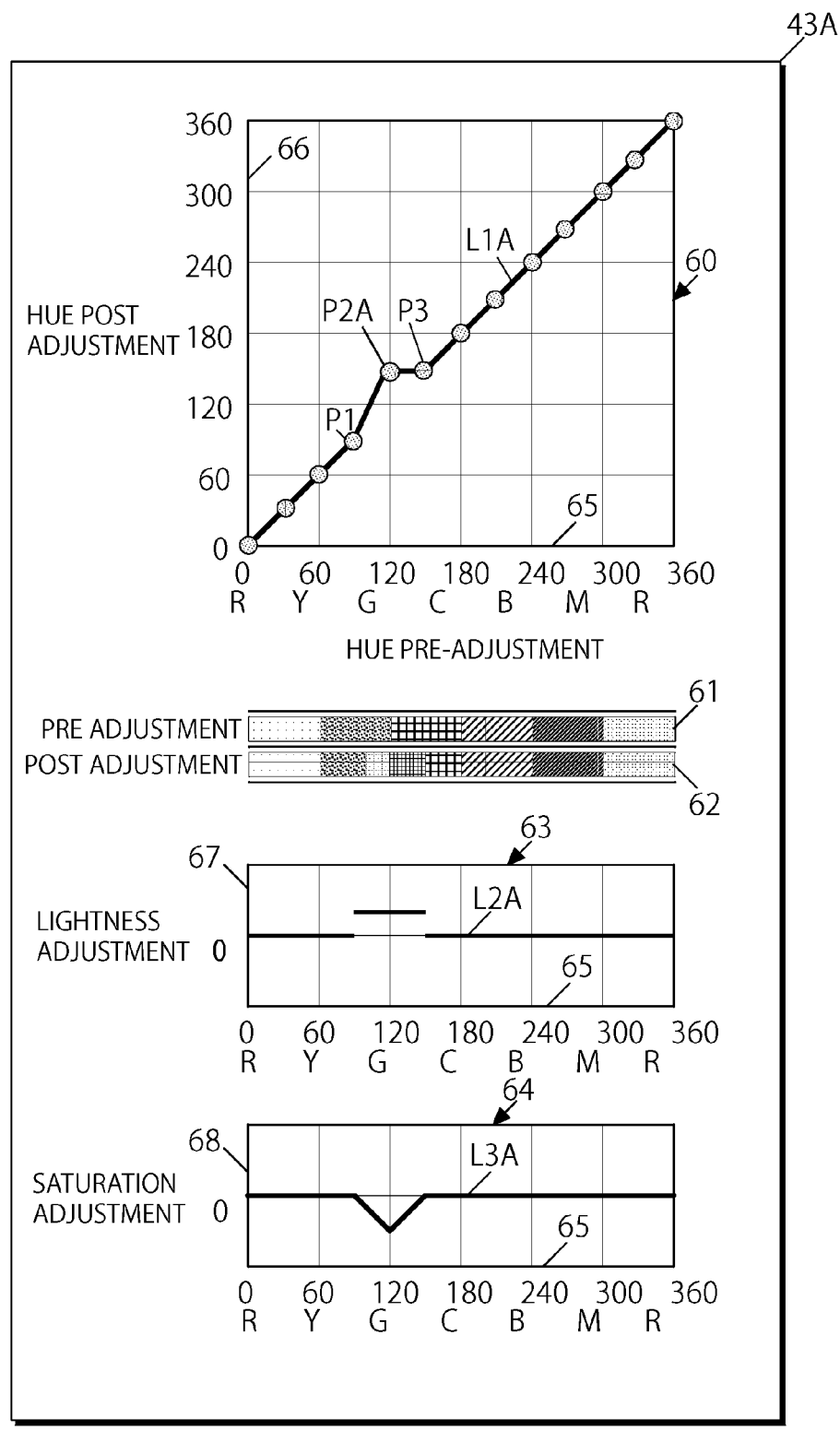
FIG. 7 is an enlarged view of a color adjustment display segment in FIG. 4 after color adjustment.

FIG. 5 is an enlarged view of the color adjustment operating unit 44A in FIG. 4 and FIGS. 6 and 7 are enlarged views of the color adjustment display segment 43A in FIG. 4, before color adjustment and after color adjustment, respectively.

Figure 8:
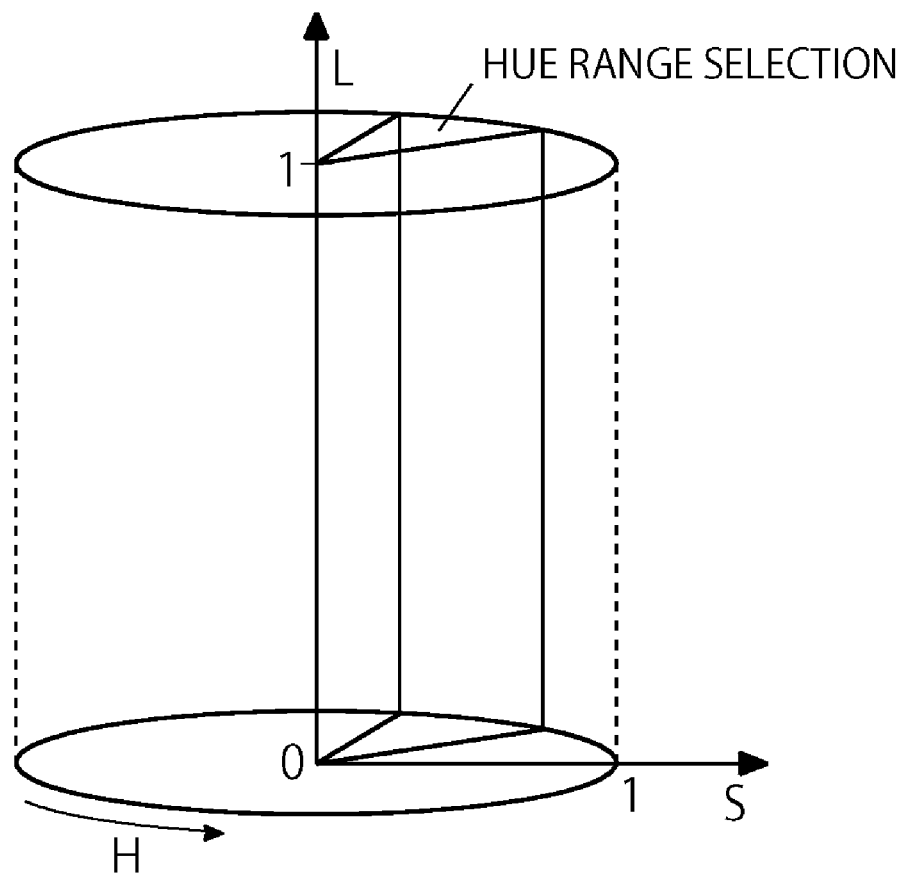
FIG. 8 is an explanatory view showing a hue range selected in an HLS color space according to an embodiment of the present invention.

A user selects a hue range by selecting an item in a dropdown list 50 in the color adjustment operating unit 44A of FIG. 5 using the pointing device of the input device 16. This item is represented by a color name of a midpoint of the hue range, the hue range being a range of ±30 degrees from this midpoint. "Green" is selected in FIG. 5 and the corresponding hue range is 90 to 150 degrees. FIG. 8 illustrates a selected hue range in an HLS color space. In this range, a hue, lightness, and saturation are adjusted.

A user adjusts a hue, lightness, and saturation, respectively, for the above-mentioned hue range by dragging knobs 51N, 52N, and 53N of sliders 51, 52, and 53 with the pointing device of the input device 16. Text boxes 51D, 52D, and 53D with UP/DOWN buttons are disposed, respectively, at the right side on the sliders 51, 52, and 53. A hue, lightness, and saturation can be finely adjusted by using associated respective UP and DOWN buttons. The text box fields of the text boxes 51D, 52D, and 53D co-located with the UP/DOWN buttons numerically indicate adjustment quantities resulting from actuation of the above-mentioned knobs and/or UP/DOWN buttons. Alternatively, a numeric value of the adjustment quantity can be directly input into the text box fields.

A feature of this embodiment is that a respective adjustment mode is provided for each one of hue, lightness, and saturation. A user can select the adjustment mode for the respective one of the hue, lightness, and saturation using dropdown lists 54, 55, and 56 disposed at the left side of the sliders 51, 52, and 53.

In the example of FIG. 5, adjustment of hue and saturation enters a proportional mode to be described later, and adjustment of lightness enters an additive-operation mode to be described later.

Reset selected-color buttons 57 and 58 are disposed at a lower part in the color adjustment operating unit 44A. The reset selected-color button 57 can be selected to initialize the content of the dropdown list 50 to a default value, such as to an unselected state. The reset all button 58 can be selected to initialize all of the settings on the color adjustment operating unit 44A to default values.

Another feature of this embodiment provides the ability to easily visually recognize the amount of adjustment in a particular hue selection range, at the color adjustment display segment 43A, for which control is provided by selecting the mode in the dropdown lists 54, 55, and 56.

FIG. 6 illustrates features of the color adjustment display segment 43A. The amount of hue adjustment is displayed by a hue adjustment quantity graph 60, hue pre-adjustment and hue post adjustment color gradations are displayed, respectively, by color bars 61 and 62, the amount of adjustment of lightness is displayed by a lightness adjustment quantity graph 63, and the amount of adjustment of saturation is displayed by a saturation adjustment quantity graph 64. Each of the hue adjustment quantity graph 60, the lightness adjustment quantity graph 63, and the saturation adjustment quantity graph 64 includes a pre-adjustment hue horizontal axis 65 and respective vertical axes indicating adjustment quantities of a hue, lightness, and saturation (Ha, La, Sa, to be described later). A hue adjustment line L1, a lightness adjustment line L2, and a saturation adjustment line L3, which are indicative of a relationship between a horizontal axis and a vertical axis before color adjustment, are displayed on the hue adjustment quantity graph 60, the lightness adjustment quantity graph 63, and the saturation adjustment quantity graph 64.

On the hue adjustment line L1, thirteen operating points (user-operable points) are displayed. Operating points at which hue angles are 0 degree and 360 degrees are identical to each other, and thus, the effective number of operating points is twelve. An interval between the adjacent operating points is half of the hue range that is selected in the dropdown list 50 of FIG. 5, and is 30 degrees in the exemplary embodiment.

When in a proportional adjustment mode, an operating point on the hue adjustment line L1, corresponding to a midpoint of the hue range selected in the dropdown list 50, moves downward or upward (in a direction orthogonal to horizontal axis) in conjunction with a transverse movement of the knob 51N. In other words, when the knob 51N is positioned at a midpoint on a slide bar, which is its initial position, an operating point corresponding to the midpoint is positioned on the hue adjustment line L1 as a straight line. When the knob 51N is moved rightward/leftward from this position, an operating point on the adjustment line L1 moves vertically upward/downward relative to the pre-adjustment hue axis 65 in proportion to the movement quantity.

The hue adjustment line L1A shown on the hue adjustment quantity graph 60 of FIG. 7 indicates a case in which the knob 51N has been moved rightward by 30 degrees, and an operating point P2 rises from the positional state illustrated in FIG. 6 up to an operating point P2A (up to a height nearly identical to P3).

In the proportional mode, the operating points P1 and P3 that are adjacent to the operating point P2A are fixed, and the hue is adjusted so that straight lines are produced between the operating point P2A and the operating point P1 and between the operating point P2A and the operating point P3.

Assuming that a) the adjustment quantity of the operating point P2 is X1 (position X1 of knob 51N), b) the lower limit and upper limit of the selected hue range are H1 and H2, respectively, and c) the pre-adjustment and post-adjustment hues in this hue range are H and Ha, respectively, then Ha between the operating points P1 and P2A is represented by formula (1) below, and Ha between the operating points P2A and P3 is represented by formula (2) below.

$$Ha=\{1+2X1/(H2-H1)\}(H-H1)+H1 \quad (1)$$

$$Ha=\{1-2X1/(H2-H1)\}(H-H2)+H2 \quad (2)$$

When in an additive-operation adjustment mode, a straight line in the selected range of the operating point P1 and the operating point P3 moves upward or downward in parallel. In other words, the adjustment quantity of a respective one of the points in the selected range is a constant value, and Ha of the selected hue range is represented by formula (3) below.

$$Ha=H+X1 \quad (3)$$

With respect to saturation, when in the additive-operation adjustment mode, assuming that a) the adjustment quantity of an operating point is X2 (position X2 of knob 52N), b) $-1 \leq X2 \leq 1$, and c) the pre-adjustment and post-adjustment saturations at given points in a selected hue range are S and Sa, respectively, then, when X2<0 and X2≧0, Sa is represented by formulas (4) and (5) below, respectively.

$$Sa=S \cdot LOG_{10}(9 \cdot X2+10) \quad (4)$$

$$Sa=S^{1-X2} \quad (5)$$

When in the proportional adjustment mode, Sa at an operating point is obtained by formula (4) or (5) above. Assuming that this value is Sx, Sa between the operating point P1 and the operating point P2A is represented by formula (6) below, and Sa between the operating points P2A and P3 is represented by formula (7) below.

$$Sa=\{2Sx/(H2-H1)\}(H-H1)+S \quad (6)$$

$$Sa=\{2Sx/(H2-H1)\}(H2-H)+S \quad (7)$$

With respect to lightness L, as is the case with saturation S, when in the additive adjustment mode, assuming that a) the adjustment quantity of an operating point is X3 (position X3 of knob 53N), b) $-1 \leq X3 \leq 1$, and c) the pre-adjustment and post-adjustment lightness values for given points in the selected hue range are L and La, respectively, then, when X3<0 and X3≧0, they are represented by formulas (8) and (9) below.

$$La=L \cdot LOG_{10}(9 \cdot X3+10) \quad (8)$$

$$La=L^{1-X3} \quad (9)$$

When in the proportional adjustment mode, L at an operating point is obtained by formula (8) or (9) above. Assuming that this value is Lx, La between the operating point P1 and the operating point P2A is represented by formula (10) below, and La between the operating point P2A and the operating point P3 is represented by formula (11) below.

$$La=\{2Lx/(H2-H1)\}(H-H1)+L \quad (10)$$

$$La=\{2Lx/(H2-H1)\}(H2-H)+L \quad (11)$$

Figure 1:
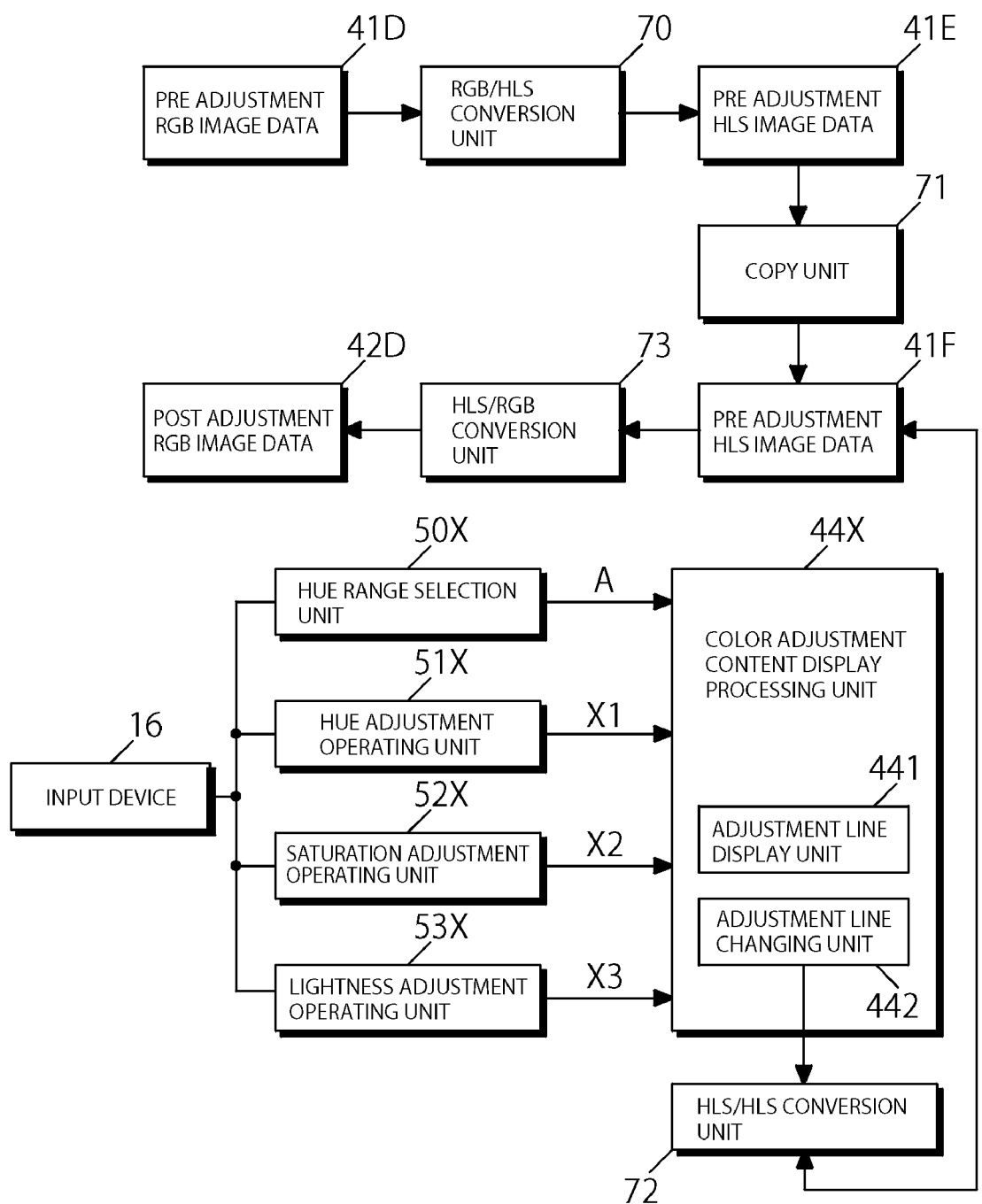
FIG. 1 is a schematic functional block diagram of color adjustment by software, according to an embodiment of the present invention.

FIG. 1 illustrates a schematic functional block diagram of color adjustment by software.

Pre-adjustment RGB image data 41D is converted to HLS image data 41E by means of an RGB/HLS conversion unit 70. This conversion is performed immediately after a file of the pre color adjustment image 41A has been selected in a dialog (not shown) and the selected file has been displayed on the pre color adjustment image 41A. A formula of conversion from a pixel value (R, G, B) of an RGB color system to a pixel value (H, L, S) of an HLS color system is known to those skilled in the art, and a description of such formula is omitted.

Assuming that adjustment is repeated by trial and error, after the above conversion, HLS image data 41E is copied by a copy unit 71, and HLS image data 41F is generated. An HLS/HLS conversion unit 72 performs color adjustment (HLS/HLS conversion) on the HLS image data 41F, based upon a corresponding one of the above conversion formulas (1) to (11), determined by an adjustment line changing unit 442 to be described later. The HLS/HLS conversion unit 72 is a specific example of a color adjustment unit. After this color adjustment has completed, an HLS/RGB conversion unit 73 converts the content of the HLS image data 41F to RGB image data 42D of the RGB color system. In this manner, the content of the RGB image data 42D is displayed as a post color adjustment image 42A of FIG. 4.

In FIG. 1, a hue range selection unit 50X, a hue adjustment operating unit 51X, a saturation adjustment operating unit 52X, a lightness adjustment operating unit 53X, and an adjustment content display processing unit 44X correspond respectively to: the dropdown list 50; the slider 51 and the dropdown list 54; the slider 52 and the dropdown list 55; and slider 53 and the dropdown list 56, all of which are illustrated in FIG. 5; and the color adjustment display segment 43A in FIG. 6.

Figure 2:
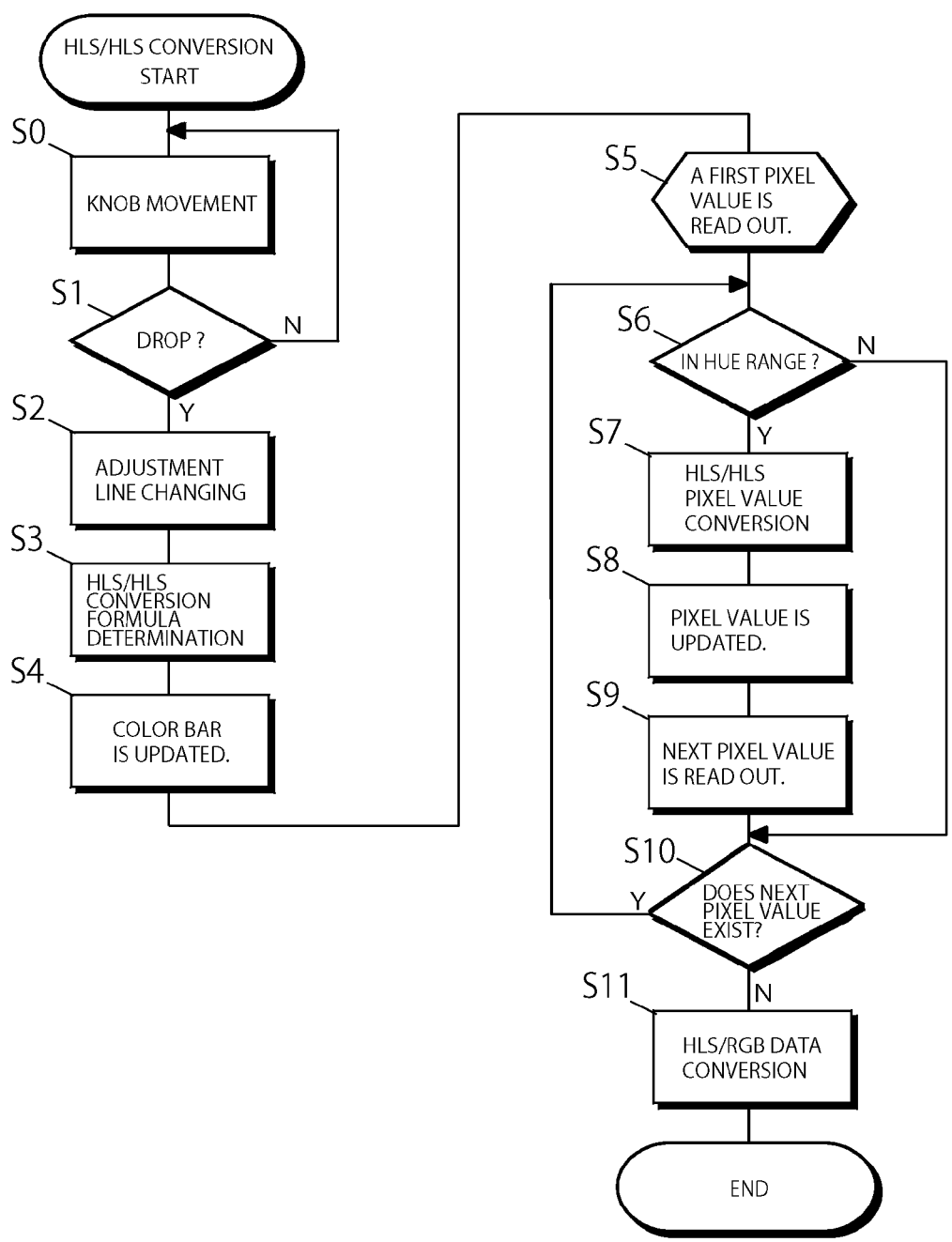
FIG. 2 is a flowchart showing an operational procedure for an event handler.

FIG. 2 illustrates a flowchart showing an operating procedure of an event handler, started by a pointing device dragging the knob 51N, 52N, or 53N in FIG. 5.

(S0) A knob is moved in response to a dragging operation of the knob 51N, 52N, or 53N by the pointing device, and a corresponding numerical value X1, X2, or X3 of a text box 51D, 52D, or 53D with an UP/DOWN button is updated to a value proportional to a distance from a slide line midpoint (the right side from a midpoint is positive and the left side therefrom is negative).

(S1) When dragging terminates, i.e., when a click button of the pointing device is released (dropped), the process flow proceeds to step S2, or if not, it returns to step S0. The processing of steps S0 and S1 is performed by the corresponding target being dragged (i.e. the hue adjustment operating unit 51X, the saturation adjustment operating unit 52X, or the lightness adjustment operating unit 53X, in FIG. 1).

An adjustment line display segment 441 of the adjustment content display processing unit 44X displays before color adjustment on a screen in FIG. 6 prior to starting processing in FIG. 2.

(S2) The adjustment line changing unit 442 moves an operating point on the hue adjustment line L1, the lightness adjustment line L2, or the saturation adjustment line L3, in response to the knob 51N, 52N, or 53N targeted to be dragged in step S1. The movement is based on a range A selected at a hue range selection unit 50X; an adjustment mode selected at the hue adjustment operating unit 51X, the saturation adjustment operating unit 52X, or the lightness adjustment operating unit 53X; and X1, X2, or X3 determined by the hue adjustment operating unit 51X, the saturation adjustment operating unit 52X, or the lightness adjustment operating unit 53X. Afterwards, the hue adjustment line L1A, lightness adjustment line L2A, or saturation adjustment line L3A, as illustrated in FIG. 7, for example, is displayed.

(S3) The adjustment line changing unit 442 of the adjustment content display processing unit 44X further determines the formulas for obtaining Ha, La, or Sa, which were described above with reference to FIGS. 6 and 7.

(S4) When a target to be dragged in step S1 is the knob 51N, the adjustment content display processing unit 44X changes a gradation in a hue range A of post-adjustment color bar 62, based upon the hue range A, the formula determined in step S3, and display data of pre-adjustment color bar 61.

The HLS/HLS conversion unit 72 performs processing by varying an HLS value while scanning the pixel value in HLS image data 41F (color adjustment), executing steps S5 to S9 below.

(S5) The HLS/HLS conversion unit 72 loads a first pixel value in the HLS image data 41F.

(S6) If the loaded pixel value is within the hue range selected at the hue range selection unit 50X, it proceeds to step S7 or, if not, it proceeds to step S9.

(S7) The HLS value is changed, based upon the conversion formula previously described.

(S8) The corresponding pixel value in the HLS image data 41F is updated using the modified HLS value.

(S9) The HLS/HLS conversion unit 72 attempts to load a next pixel value in the HLS image data 41F.

(S10) If the pixel value to be loaded in step S9 exists, it returns to step S6, or if not, it proceeds to step S11.

(S11) The HLS/RGB conversion unit 73 converts each of the HLS values in the HLS image data 41F to an RGB value, and generates RGB image data 42D. In this manner, the post color adjustment image 42A is updated in FIG. 4.

When the text boxes 51D, 52D, and/or 53D are used (e.g. by operating the UP/DOWN button and/or entering values into the text box) instead of dragging a knob, the same processing as in FIG. 2 is performed except for the processing of steps S0 and S1.

According to the embodiment, before color adjustment takes place, a screen displays an orthogonal coordinate system 60 between the pre-adjustment hue axis 65 and adjustment target axis 66 indicative of a degree of adjustment of a hue, an orthogonal coordinate system 63 between the pre-adjustment hue axis 65 and adjustment target axis 67 indicative of a degree of adjustment of a lightness, an orthogonal coordinate system 64 between the pre-adjustment hue axis 65 and adjustment target axis 68 indicative of a degree of adjustment of a saturation, and adjustment lines L1 to L3 indicative of a relationship on the orthogonal coordinate systems 60, 63, 64. Afterwards, in response to an operation by the input device 16, the adjustment lines L1 to L3 change in the selected hue range A. A user can easily visually recognize how color adjustment is performed in the hue range A. In this manner, it becomes possible to efficiently perform color adjustment.

A rule on how the adjustment lines L1 to L3 are changed so as to pass through a specific point in the hue range A can be selected by selection units 54 to 56 as an adjustment mode. The adjustment lines L1 to L3 are changed based upon the selected adjustment mode; thus, it is unnecessary to finely divide the hue range A. In this manner, it becomes possible to efficiently perform color adjustment.

Figure 12:
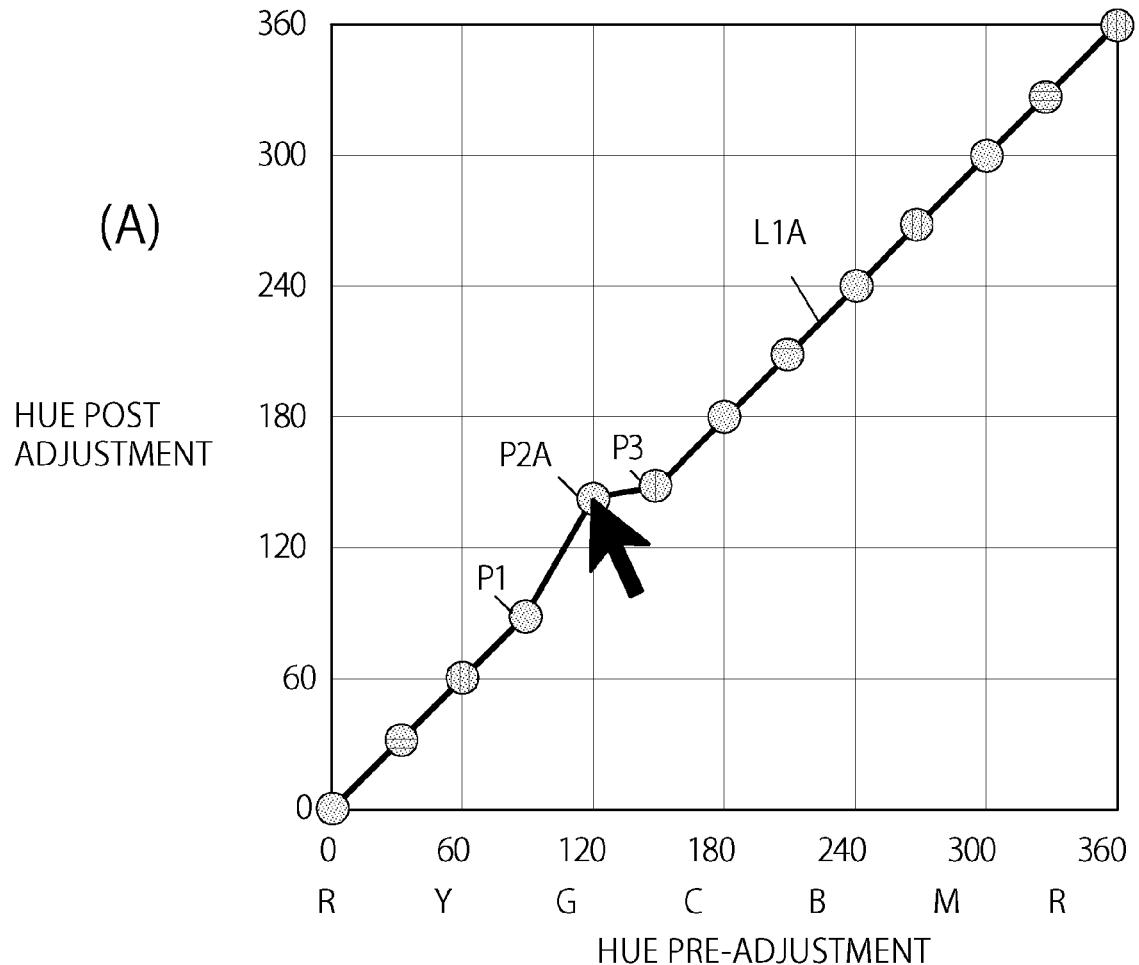
FIGS. 12A and 12B are explanatory views of a GUI according to another embodiment of the present invention.

In another embodiment, as illustrated in FIG. 12A, an operating point is moved by directly selecting it with a pointing device and performing a drag-and-drop operation or by operating the arrow keys on a keyboard after the operating point has been selected. Operating points P1 and P3 adjacent to the moved operating point are regarded as a lower limit and an upper limit of a hue range.

As illustrated in FIG. 12B, after one operating point has been moved, an adjacent operating point P3A is moved, whereby a hue selection range further automatically expands by an interval between the operating points, and a range between P1 to P4 is obtained. Moving a plurality of operating points corresponds to mode selection. The adjustment mode selection units 54 to 56 in FIG. 5 may be omitted.

According to this alternative embodiment, the Graphical User Interface (GUI) is simpler than that of the previous embodiment and a graph can be directly operated, thus advantageously improving operability.

Further various adjustment modes may be provided, allowing color adjustment to be performed more efficiently.

The above-described embodiments introduced a case in which a hue, saturation, and lightness are represented by the HLS color system. The present invention is not limited thereto, and a hue, saturation, and lightness may be represented using another color system, such as an HSB color system, a Munsell color system, or an Ostwald color system.

The embodiments set forth an example in which the host computer 10 (one example of "color adjustment apparatus") is connected to the image forming apparatus 30 via the LAN (Local Area Network) 20. Alternatively, the color adjustment apparatus may be part or all of the image forming apparatus 30. In this case, color adjustment is performed from an operation panel 36 of the image forming apparatus 30, and the operation panel 36 is also equipped with functions of the input device 16 and the display device 17.

In addition, the embodiments described the color adjustment program as being included in the storage unit HDD 15 of the host computer 10. Another type of storage unit, such as an optical storage device, a magneto-optical disk, a flash memory (USB stick, USB key), a floppy disk, a magnetic tape or the like, may alternatively be used.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A color adjustment apparatus, comprising:
an input unit for receiving an input operation;
a color adjustment display unit for displaying orthogonal coordinate systems, wherein the orthogonal coordinate systems include a pre color adjustment hue axis and an adjustment target axis, wherein the adjustment target axis indicates a degree of adjustment of a hue, saturation, or lightness, wherein an adjustment line is displayed on each of the orthogonal coordinate systems, and wherein the adjustment line indicates a relationship between pre color adjustment and post color adjustment on the orthogonal coordinate systems;
an adjustment line changing unit for changing the adjustment line in response to an operation by the input unit; and
a color adjustment unit for adjusting a hue, saturation, and lightness of a target image in correspondence with the adjustment line changed by the adjustment line changing unit,
wherein the adjustment line changing unit changes the adjustment line in a selected hue range by shifting a segment of the adjustment line, in response to the operation of the input unit,
wherein the color adjustment display unit displays operating points on the adjustment line on the orthogonal coordinate system corresponding to the hue, and wherein an interval between the adjacent operating points is half of the hue range that is selected in response to the operation by the input unit.

2. The color adjustment apparatus according to claim 1, wherein the adjustment line changing unit moves a specific point on the adjustment line by a quantity indicated by the input unit.

3. The color adjustment apparatus according to claim 2, wherein the specific point is located in a selected hue range bounded by two endpoints located on the adjustment line, wherein the adjustment line changing unit moves the specific point, but not the two endpoints, and wherein the specific point is connected to the two endpoints by respective line segments on the adjustment line.

4. The color adjustment apparatus according to claim 1, further comprising:
  a storage unit storing rules on how the adjustment line is changed according to one of a plurality of adjustment modes, so as to pass through the specific point in the selected hue range; and
  an adjustment mode selection unit for selecting any of the plurality of adjustment modes in response to an operation by the input unit,
  wherein the adjustment line changing unit changes the adjustment line based upon the adjustment mode selected by the adjustment mode selection unit.

5. The color adjustment apparatus according to claim 2, further comprising:
  a hue range selection unit for selecting a hue range in response to an operation by the input unit; and
  a slider display segment for displaying a slider in response to the orthogonal coordinate systems, and for indicating movement of a knob of the slider in response to an operation by the input unit,
  wherein the adjustment line changing unit shifts the specific point in a direction orthogonal to the hue axis, in response to a movement quantity of the knob, and changes the adjustment line in the selected hue range on the color adjustment display unit, in response to the operation by the input unit.

6. The color adjustment apparatus according to claim 2, wherein the specific point is a point on the adjustment line selected by the input unit.

7. The color adjustment apparatus according to claim 6, wherein the color adjustment display unit displays a plurality of selectable operating points at equal intervals on the adjustment line, wherein the selected hue range is a hue range bounded by endpoints corresponding to operating points on a hue axis, and wherein the endpoints are adjacent to the selectable points on both sides.

8. The color adjustment apparatus according to claim 1, further comprising:
  a first image conversion unit for converting RGB color system image data to color system image data specifying a hue, saturation, and lightness; and
  a second image conversion unit for converting the color system image data specifying the hue, saturation, and lightness, adjusted by the color adjustment unit, to adjusted RGB color system image data.

9. An image forming apparatus, comprising:
  an input unit for receiving an input operation;
  a color adjustment display unit for displaying orthogonal coordinate systems, wherein the orthogonal coordinate systems include a pre color adjustment hue axis and an adjustment target axis, wherein the adjustment target axis indicates a degree of adjustment of a hue, saturation, or lightness, wherein an adjustment line is displayed on each of the orthogonal coordinate systems, and wherein the adjustment line indicates a relationship between pre color adjustment and post color adjustment on the orthogonal coordinate systems;
  an adjustment line changing unit for changing the adjustment line in response to an operation by the input unit; and
  a color adjustment unit for adjusting a hue, saturation, and lightness of a target image in correspondence with the adjustment line changed by the adjustment line changing unit,
  wherein the adjustment line changing unit changes the adjustment line in a selected hue range by shifting a segment of the adjustment line, in response to the operation of the input unit,
  wherein the color adjustment display unit displays operating points on the adjustment line on the orthogonal coordinate system corresponding to the hue, and wherein an interval between the adjacent operation points is half of the hue range that is selected in response to the operation by the input unit.

10. The image forming apparatus according to claim 9, wherein the adjustment line changing unit moves a specific point on the adjustment line by a quantity indicated by the input unit.

11. A non-transitory computer-readable recording medium having stored thereon color adjustment program codes to cause a computer to adjust a hue, saturation, and lightness via a Graphical User Interface (GUI), the color adjustment program codes comprising:
  a first program code for displaying orthogonal coordinate systems, wherein the orthogonal coordinate systems include a pre color adjustment hue axis and an adjustment target axis, wherein the adjustment target axis indicates a degree of adjustment of a hue, saturation, or lightness, wherein an adjustment line is displayed on each of the orthogonal coordinate systems, and wherein the adjustment line indicates a relationship between pre color adjustment and post color adjustment on the orthogonal coordinate systems;
  a second program code for changing the adjustment line within selected hue range; and
  a third program code for adjusting a hue, saturation, and lightness of a target image in correspondence with the changed adjustment line,
  wherein the first program code causes the computer to display operating points on the adjustment line on the orthogonal coordinate system corresponding to the hue, and wherein an interval between the adjacent operating points is half of the hue range that is selected in response to the operation by the input unit,
  wherein the second program code causes the computer to change the adjustment line in the selected hue range by shifting a segment of the adjustment line.

12. The non-transitory computer-readable recording medium according to claim 11, wherein the second program code causes the computer to move a specific point on the adjustment line.

13. The non-transitory computer-readable recording medium according to claim 12, wherein the specific point is located in a selected hue range bounded by two endpoints located on the adjustment line, wherein the adjustment line changing unit moves the specific point, but not the two endpoints, and wherein the specific point is connected to the two endpoints by respective line segments on the adjustment line.

14. The non-transitory computer-readable recording medium according to claim 11, wherein the color adjustment program codes further comprise:
  a fourth program code for selecting any of a plurality of adjustment modes specifying unique rules for changing the adjustment line,
  wherein the second program code causes the computer to change the adjustment line, based upon the selected adjustment mode.

15. The non-transitory computer-readable recording medium according to claim 12, wherein the color adjustment program codes further comprise:

a fifth program code for selecting a hue range; and a sixth program code for displaying a slider in response to a respective one of the orthogonal coordinate systems and for indicating movement of a knob of the slider, wherein the second program code causes the computer to shift the specific point in a direction orthogonal to the hue axis in response to a movement quantity of the knob, and to change the adjustment line in the selected hue range.

16. The non-transitory computer-readable recording medium according to claim 12, wherein the first program code causes the computer to display a plurality of selectable operating points at equal intervals on the adjustment line, wherein the selected hue range is a hue range bounded by endpoints corresponding to operating points on a hue axis, and wherein the endpoints are adjacent to the selectable points on both sides.

17. The non-transitory computer-readable recording medium according to claim 11, wherein the color adjustment program codes further comprise:

a seventh program code for converting RGB color system image data to color system image data specifying a hue, saturation, and lightness; and a eighth program code for converting the color system image data specifying the hue, saturation, and lightness to adjusted RGB color system image data.

\* \* \* \* \*